(12) United States Patent
Toda

(10) Patent No.: US 8,040,378 B2
(45) Date of Patent: Oct. 18, 2011

(54) IMAGE FORMING APPARATUS FOR SPECIFYING A COLOR MATERIAL AND METHOD THEREOF

(75) Inventor: Katsuyuki Toda, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 310 days.

(21) Appl. No.: 11/905,672

(22) Filed: Oct. 3, 2007

(65) Prior Publication Data

US 2008/0084476 A1 Apr. 10, 2008

(30) Foreign Application Priority Data

Oct. 4, 2006 (JP) ................................. 2006-273139

(51) Int. Cl.
*H04N 5/225* (2006.01)
*G06F 15/00* (2006.01)
*G06F 3/12* (2006.01)
*G06K 1/00* (2006.01)

(52) U.S. Cl. ...................... 348/207.2; 358/1.9; 358/1.15
(58) Field of Classification Search ................ 348/207.2, 348/231.3
See application file for complete search history.

(56) References Cited

U.S. PATENT DOCUMENTS

| | | | |
|---|---|---|---|
| 7,564,487 B2 | 7/2009 | Kato et al. | |
| 2002/0163655 A1* | 11/2002 | Zhou | 358/1.4 |
| 2003/0122935 A1* | 7/2003 | Shiohara | 348/207.2 |
| 2003/0156196 A1 | 8/2003 | Kato et al. | |
| 2004/0135889 A1* | 7/2004 | Koizumi et al. | 348/207.1 |
| 2004/0233476 A1* | 11/2004 | Shoda | 358/2.1 |
| 2005/0200923 A1* | 9/2005 | Shimada et al. | 358/537 |
| 2006/0072016 A1* | 4/2006 | Shiohara | 348/207.2 |
| 2006/0158673 A1* | 7/2006 | Gondek et al. | 358/1.13 |
| 2006/0238636 A1* | 10/2006 | Shiohara | 348/333.01 |
| 2007/0046974 A1* | 3/2007 | Machida | 358/1.14 |

FOREIGN PATENT DOCUMENTS

| | | |
|---|---|---|
| CN | 1442995 A | 9/2003 |
| JP | 2003-244630 | 8/2003 |
| JP | 2004-064740 | 2/2004 |
| JP | 2005-246723 | 9/2005 |
| JP | 2006-256141 | 9/2006 |

OTHER PUBLICATIONS

Chinese Office Action dated Jul. 3, 2009 corresponding to Application No. 2007101649288 and English translation thereof.
Office Action dated Jan. 8, 2010 by the Chinese Patent Office for corresponding Chinese Application No. 2007101619288 and English translation thereof.
Japanese Office Action dated Aug. 16, 2011 in corresponding Japanese Application No. 2006-273139.

* cited by examiner

*Primary Examiner* — Kelly L Jerabek
(74) *Attorney, Agent, or Firm* — Harness, Dickey & Pierce, P.L.C.

(57) ABSTRACT

A color material specifying unit of a digital camera generates color material specification data that specifies a color material to be used when forming an image in a printer. A transmitting unit transmits, to the printer, print instruction data including the color material specification data generated by the color material specifying unit, and image data stored in a storage unit. A receiving unit of the printer receives the image data and the print instruction from the digital camera. A color material specification retrieving unit retrieves the color material specification data from the digital camera. By using the color material specified based on the color material specification data, an image output unit forms the image from the image data received by the receiving unit, and prints the formed image on a recording paper.

14 Claims, 7 Drawing Sheets

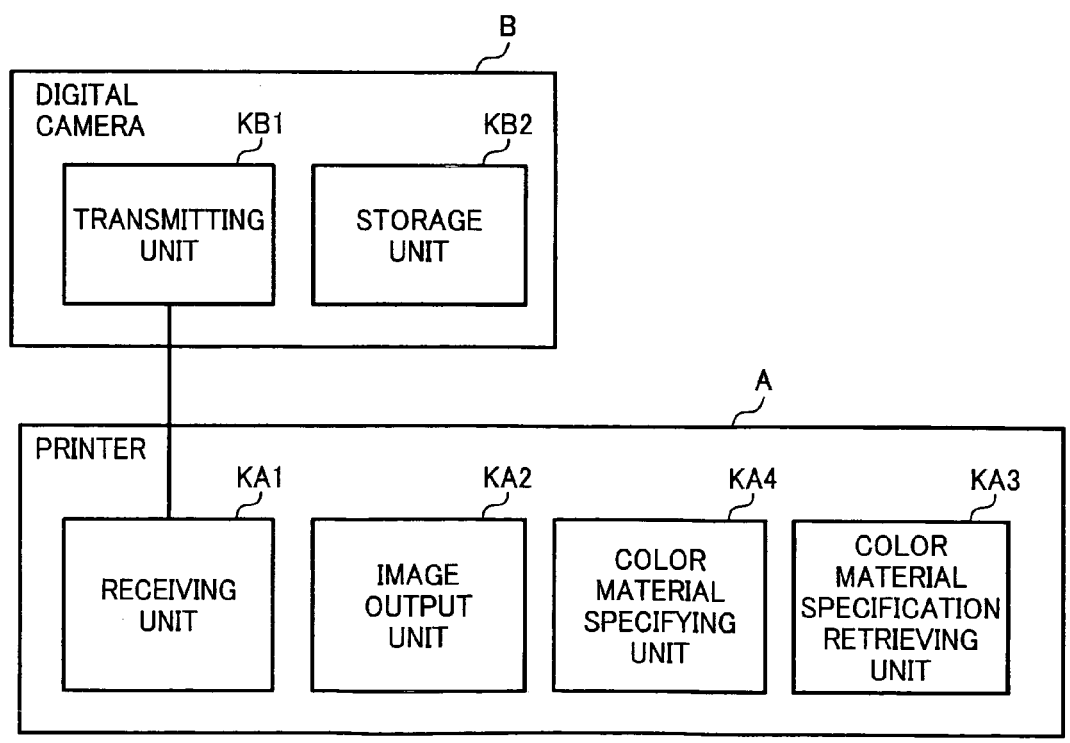

FIG. 9

```
<JOBSTART>
<Quality=Normal>  ←— J1
<PaperSize=A4>  ←— J2
<Date=Off>  ←— J3
<Layout=A4/1 × 1>
<Optimize=On>
<Picture=00000001, 00000002, 00000003>  ←— J5
</JOBSTART>
```

FIG. 10

```
<JOBSTART>
<Quality=Normal>
<PaperSize=A4>
<Date=Off>
<Layout=A4/1 × 1>
<Plane=K/75%, C/75%, M/75%, Y/75%>  ←— J4'
<Picture=00000001, 00000002, 00000003>  ←— J5
</JOBSTART>
```

IMAGE FORMING APPARATUS FOR SPECIFYING A COLOR MATERIAL AND METHOD THEREOF

CROSS-REFERENCE TO RELATED APPLICATIONS

The present application claims priority to and incorporates by reference the entire contents of Japanese priority document, 2006-273139 filed in Japan on Oct. 4, 2006.

BACKGROUND OF THE INVENTION

1. Field of the Invention

The present invention relates to a technology for specifying a color material to be used when printing an image in an image forming apparatus.

2. Description of the Related Art

A direct printing system is widely used, in which a digital camera that serves as an image supplying apparatus, and a printer device that serves as an image forming apparatus are directly connected to each other without using a personal computer (PC). In such a direct printing system, the digital camera directly transfers an image stored in the digital camera to the printer device, thereby printing the image by the printer without using a PC. In recent years, various direct printing systems have been developed. For example, Japanese Patent Application Laid-open No. 2004-64740 discloses a conventional technology in which the digital camera communicates with the printer device in accordance with a predetermined communication procedure, thereby enabling the direct printing. Furthermore, a conventional technology is disclosed in Japanese Patent Application Laid-open No. 2003-244630, in which image feature data is generated in the digital camera by extracting features of an image, the image feature data is saved as well as the image, and an image correcting process is executed for the image in the printer device by using the image feature data.

In the conventional technologies, when an image is taken by the digital camera and the image is printed by the printer device, it is difficult to specify a color material to be used when printing an image. For example, in some cases, a printer device reproduces black color by mixing color materials of four colors, such as cyan (C), magenta (M), yellow (Y), and black (K), even if a monochrome image is to be printed. However, in an above situation, when compared with printing of an image by reproducing black color by using the color material K without using other color materials, printing performance, such as a processing time and a processing cost required for printing an image, and an image quality may be degraded.

SUMMARY OF THE INVENTION

It is an object of the present invention to at least partially solve the problems in the conventional technology.

According to an aspect of the present invention, there is provided an image forming apparatus including a receiving unit that receives image data and print instruction data; an acquiring unit that acquires color material specification data that specifies color material to be used when forming an image based on the image data; and an image output unit that forms an image from the image data based on the color material specification data.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 6 is an example of a data structure of print job data according to the first embodiment;

FIG. 7 is a functional block diagram of a printer A and a digital camera B according to a second embodiment of the present invention;

FIG. 9 is an example of a data structure of print job data according to the second embodiment; and FIG. 10 is an example of print job data that includes color material specification data for specifying usage percentage of a color material according to modifications of the present invention.

DETAILED DESCRIPTION OF THE PREFERRED EMBODIMENTS

Exemplary embodiments of the present invention are explained in detail below with reference to the accompanying drawings.

Figure 1:
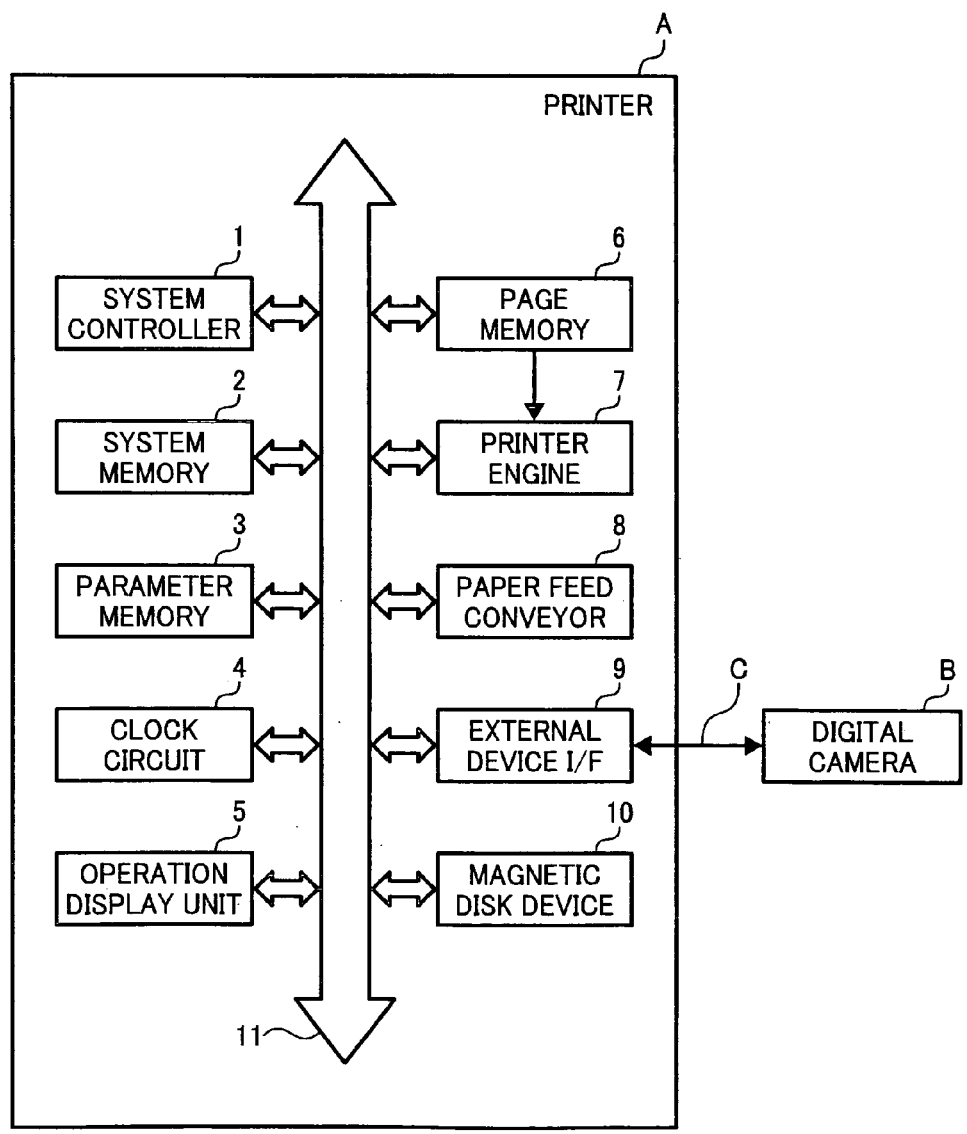
FIG. 1 is a block diagram of an image printing system according to a first embodiment of the present invention.

FIG. 1 is a block diagram of an image printing system according to a first embodiment of the present invention. As shown in FIG. 1, the image printing system includes a printer A that servers as the image forming apparatus, and a digital camera B that serves as the image supplying device connected to the printer A via a universal serial bus (USB) cable that serves as an interface.

It is assumed that the printer A is a laser printer. As shown in FIG. 1, the printer A includes a system controller 1 that executes various control processes, such as a control process of each unit of the printer A and an image forming process. The system controller 1 is configured in such a manner that a central processing unit (CPU), which forms a microcomputer, serves as its main body. The system controller 1 controls the printer A based on various programs stored in a system memory 2 and a magnetic disk device 10. The system memory 2, a parameter memory 3, a clock circuit 4, an operation display unit 5, a page memory 6, a printer engine 7, a paper feed conveyor 8, an external device interface (I/F) 9, and the magnetic disk device 10 are connected via an internal bus 11 to the system controller 1.

The system memory 2 stores therein various computer programs and various data, and includes a work area of the system controller 1. The parameter memory 3 stores therein various data unique to the printer A. The magnetic disk device 10 stores therein the various computer programs and various data.

The clock circuit 4 outputs information on a current date and time. The operation display unit 5 includes various operation keys for a user to input various instructions, and a display unit that displays various data.

The page memory 6 stores therein a printing image of image data that is to be printed. The printer engine 7 forms an image, and prints, on a recording paper (not shown in a drawing), the printing image stored in the page memory 6. Because the printer A is the laser printer, the printer engine 7 forms the image by an electrophotographic processing method, thereby printing the image on the recording paper. The paper feed conveyor 8 separates the recording paper from a paper cassette (not shown in the drawing) that retains the recording paper and conveys a paper to an image recording position of the printer engine 7, and then, ejects the paper to a catch tray (not shown in the drawing).

The external device I/F 9 controls transceiving of data between the external device I/F 9 and the digital camera B via the USB cable.

Figure 2:
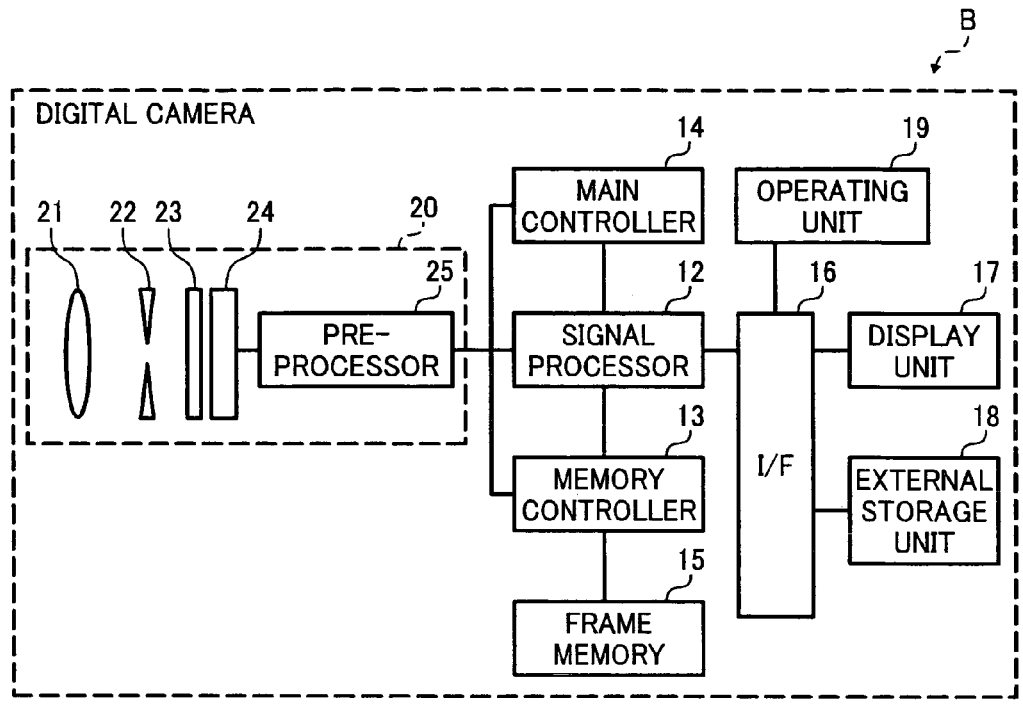
FIG. 2 is a block diagram of a hardware structure of a digital camera B shown in FIG. 1.
Figure 3:
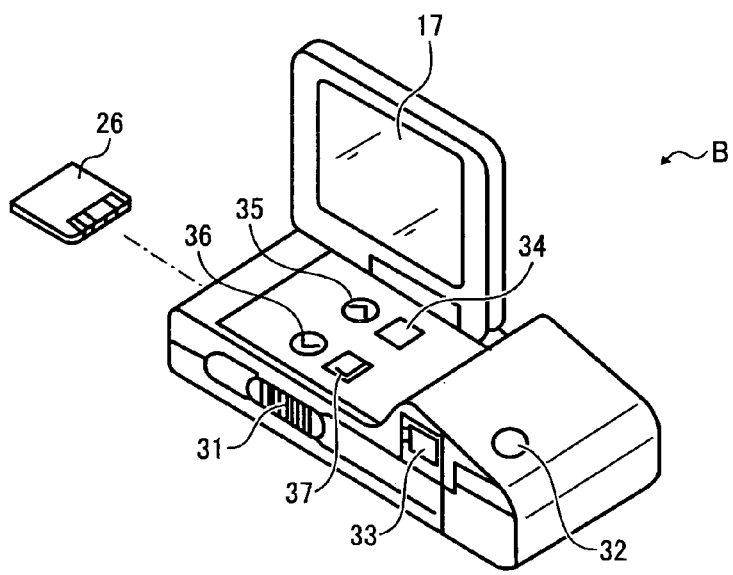
FIG. 3 is a schematic diagram of the digital camera B shown in FIG. 1.

FIG. 2 is a block diagram of the hardware structure of the digital camera B. FIG. 3 is a schematic diagram of the digital camera B.

As shown in FIG. 2, the digital camera B serving as the image supplying apparatus includes a signal processor 12, a memory controller 13, a main controller 14, a frame memory 15, an interface (I/F) 16, a display unit 17, an external storage unit 18 capable of recording/reading various data to/from a media 26 that is a storage medium, an imaging unit 20, and an operating unit 19. The imaging unit 20 includes a lens 21, an aperture 22, a shutter 23, a photoelectric transducer 24, and a preprocessor 25.

The signal processor 12 is connected to the preprocessor 25, the memory controller 13, the main controller 14, and the I/F 16. The memory controller 13 is connected to the frame memory 15. Furthermore, the main controller 14 is connected to the memory controller 13 and the frame memory 15 is also connected to the memory controller 13. The I/F 16 is connected to the display unit 17, the external storage unit 18, and the operating unit 19. Furthermore, for communicating with the printer A, the USB cable C is also connected to the I/F 16.

The lens 21, the aperture 22, the shutter 23, and the photoelectric transducer 24 are positioned in that order on an optical axis. The photoelectric transducer 24 is connected to the preprocessor 25. In the photoelectric transducer 24 of the imaging unit 20, a charge coupled device (CCD) is used. The preprocessor 25 includes an analog signal processor or an analog-to-digital converter (A/D converter) formed of a preamplifier and an automatic gain control circuit (AGC). Upon executing preprocesses, such as amplification and a clamp, analog image signals that have been output from the photoelectric transducer 24 are converted into digital image signals.

The signal processor 12 is constituted of a digital signal processor (DSP processor), includes an image compressing function, and executes various imaging processes such as color separation, white balance adjustment, and γ correction in response to the digital image signals obtained in the imaging unit 20.

The memory controller 13 stores processed image signals in the frame memory 15, and reads the image signals stored in the frame memory 15.

The main controller 14 is constituted of the microcomputer, and includes a central processing unit (CPU) that controls each unit of the digital camera B, a read only memory (ROM) that stores therein various control programs to be executed by the CPU, and a random access memory (RAM) serving as the work area. As a substitute for the control programs stored in the ROM, it is possible to load the media 26 that stores therein the control programs onto the external storage unit 18 of the digital camera B, so that the control programs can be executed by the CPU of the digital camera B. The frame memory 15 at least stores therein two images. Generally, semiconductor memories, such as a video random access memory (VRAM), a static random access memory (SRAM), and a dynamic random access memory (DRAM) are used.

The signal process, such as image compression in the signal processor 12, are executed, and then the image signals read from the frame memory 15 are stored as image files in the external storage unit 18 via the I/F 16. The external storage unit 18 that is constituted of an integrated circuit (IC) memory card and a magnetic optical disk, and reads/writes various signals such as the image signals that are delivered via the I/F 16.

The image signals stored in the external storage unit 18 are read by transmitting the image signals to the signal processor 12 via the I/F 16 and expanding the image in the signal processor 12. Upon executing, in the signal processor 12, the signal processes such as the digital analog conversion (digital-to-analog conversion) and the amplification to the image signals, the image signals that are read from the external storage unit 18 and the frame memory 15 are transmitted to the display unit 17 via the I/F 16. The display unit 17 displays the image in accordance with the image signals sent via the I/F 16. The display unit 17 is constituted of a liquid crystal display (LCD) that is set in a housing of the digital camera B.

As shown in FIG. 3, the digital camera B includes a power supply switch 31, a shutter 32, a finder 33, scroll keys 35 and 36 that scroll the image displayed in the display unit in an upward and a downward direction, and a determination key 37. The operating unit 19 is constituted of the shutter 32, a photograph-mode setting key 34, the scroll keys 35 and 36, and the determination key 37.

Figure 4:
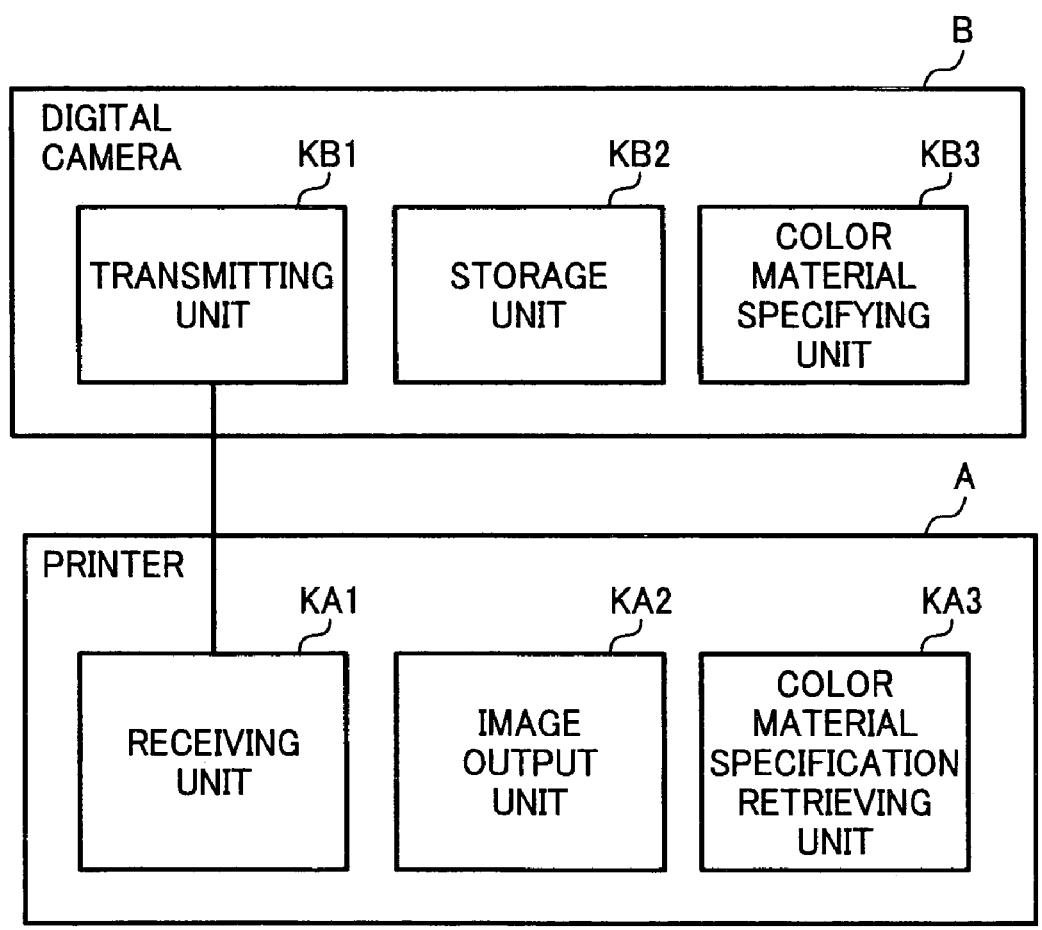
FIG. 4 is a functional block diagram of a printer A and the digital camera B shown in FIG. 1.

FIG. 4 is a functional block diagram of the printer A and the digital camera B. As shown in FIG. 4, the printer A includes a receiving unit KA1, an image output unit KA2, and a color material specification retrieving unit KA3. Each unit is a function that is implemented by executing the various computer programs stored in the system memory 2 or the magnetic disk device 10 by the system controller 1 of the printer A.

The receiving unit KA1 communicates with the digital camera B in accordance with a predetermined communication procedure and receives, from the digital camera B, the image data and print instruction data that instructs to print the image represented by the image data. The color material specification retrieving unit KA3 retrieves, from the digital camera B, color material specification data that specifies the color material to be used when forming the image. By using the color material that is specified based on the color material specification data that is retrieved by the color material specification retrieving unit KA3, the image output unit KA2 forms the image represented by the image data that is received by the receiving unit KA1 and prints the formed image on the recording paper.

As shown in FIG. 4, the digital camera B includes a storage unit KB2, a transmitting unit KB1, and a color material specifying unit KB3. Each of above units is a function to be implemented by executing the various computer programs stored in the system memory 2 or the magnetic disk device 10 by the system controller 1 of the digital camera B.

The transmitting unit KB1 communicates with the printer A in accordance with the predetermined communication procedure. The storage unit KB2 stores therein the image data. In response to operations of the user, the color material specifying unit KB3 generates the color material specification data that specifies the color material to be used when forming the image in the printer A. The transmitting unit KB1 transmits, to the printer A, the print instruction data that includes the color material specification data generated by the color material specifying unit KB3 and the image data stored in the storage unit KB2.

Figure 5:
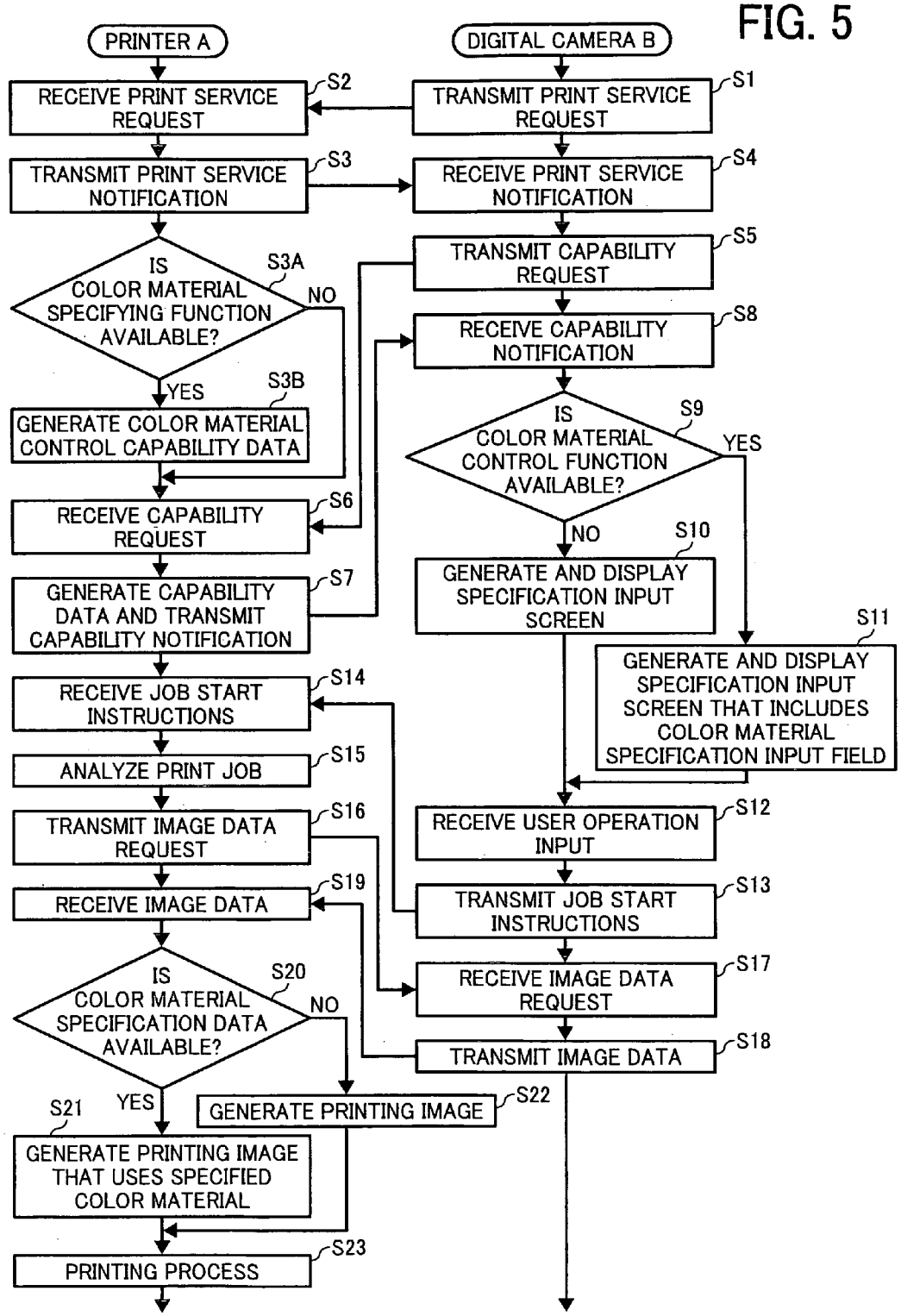
FIG. 5 is a flowchart for explaining a communication procedure in which the digital camera B instructs the printer A to print an image according to the first embodiment.

FIG. 5 is a flowchart for explaining a communication procedure while the digital camera B instructs the printer A to print the image.

A user connects the digital camera B to the printer A by the USB cable and operates the operating unit 19 of the digital camera B. If the user inputs the operation that instructs to print the image, the digital camera B transmits print service request command to the printer A (step S1). Because the digital camera B includes a color material specifying function (the color material specifying unit KB3) that can specify the color material when printing the image, color material specifying function data is included in print service request command, and is transmitted to the printer A. Furthermore, print service request command transmitted from the digital camera, which does not have the color material specifying function, does not include the color material specifying function data.

Upon receiving print service request command (step S2), the printer A transmits print service notification response to the digital camera B in response to the command (step S3). For determining whether print service request command includes the color material specifying function data, the printer A determines whether the digital camera B includes the color material specifying function (step S3A). If the digital camera B includes the color material specifying function (Yes at step S3A), the printer A generates color material control capability data indicating that the specification of the color material can be controlled (step S3B).

However, upon receiving print service notification response (step S4), the digital camera B transmits capability request command to the printer A (step S5). Upon receiving capability request command (step S6), the printer A puts capability data that can be specified at the time of printing at own terminal in capability notification response, and transmits the capability notification response to the digital camera B (step S7). The capability data indicates an output quality (such as a high-speed, normal, and a high-definition), a paper size, a layout, and an availability of an index printing. Furthermore, if the color material control capability data is generated at step S3B, the printer A puts the color material control capability data in the capability data, and transmits to the digital camera B.

Upon receiving capability notification response (step S8), based on the capability data included in the capability notification response, the digital camera B generates a specification input screen for the user to input printing conditions (such as color material specification, the output quality, the paper size, whether to output date, a number of pages per sheet, and index printing instructions), and to select the image data to be printed. For determining whether the color material control capability data is included in capability notification response, the digital camera B determines whether the printer A includes the color material control capability data (step S9). Upon determining that the printer A includes the color material control capability data (Yes at step S9), the digital camera B generates a specification input screen that includes an input field for the user to input the color material specification, and displays the generated specification input screen on the display unit 17 (step S11). Upon determining that the printer A does not include the color material control capability data (No at step S9), the digital camera B generates, for the user, the specification input screen that does not include the input field to input the color material specification, and displays the generated specification input screen on the display unit 17 (step S10).

Based on a display of the specification input screen, the user inputs various printing conditions via the operating unit 19, and selects the image data to be printed. The user can specify only black (K) as the color material or only cyan (C) and magenta (M) as the color material. Upon receiving the operation input of the user (step S12), the digital camera B transmits, to the printer A, job start instructions command (print instruction data) including print job data (step S13). FIG. 6 is an example of a data structure of the print job data. As shown in FIG. 6, the print job data includes a specification data J1 that specifies the output quality, a specification data J2 that specifies the paper size, a specification data J3 that specifies the availability of the index printing, a color material specification data J4 that specifies the color material, the specification data J5 that specifies an image data identification (ID) of the image data to be printed. For example, when only K is specified as the color material, with respect to K, "on" is written in the color specification data J4, which indicates that the color material K is used, and "off" is written with respect to C, M, and Y, which indicates that the color material C, Y and M are not used.

Upon receiving job start instructions command (step S14), the printer A analyzes the print job data included in job start instructions command (step S15). The printer A sequentially retrieves more than or equal to one image data ID included in the print job data, and sequentially transmits, to the digital camera B, image data request response that includes data specifying each image data ID (step S16). Upon receiving image data request response (step S17), the digital camera B transmits one by one, to the printer A, the image data of the image data ID that is specified based on the data included in image data request response (step S18).

Upon receiving the image data (step S19), the printer A generates the printing image based on the received image data, and executes the printing process. Specifically, the received image data is encoded in any image format. Thus, the printer A decodes the received image data, e.g., generates the image data in red, green, blue (RGB) format and converts the image data in the RGB format into the printing image of cyan, yellow, magenta, black (CYMK) format. Based on a size of the image data (resolution and a number of pixels) and the size of a printing paper or a printing area, a variable power of the image to be printed is processed. The printer A determines whether the color material is specified in the print job data (step S20). Upon determining that the color material is specified in the print job data (Yes at step S20), by using the specified color material, the printer A generates the printing image of the image data to be printed (step S21), and then prints the image (step S23). Upon determining that the color material is not specified in the print job data, the printer A ends entire printing process, and transmits process result notification response to the digital camera B. Upon receiving process result notification response from the printer A, the digital camera B ends a print job.

According to the structure described above, because the color material can be specified while printing the image, e.g., the image taken by the digital camera in a black and white mode can be printed only with the color material K. However, the color of the image can be reproduced only by black without mixing C, M, and Y. Furthermore, without limiting to the black and white mode, the image taken in a full color mode can be printed by specifying the color material as mentioned earlier. For example, the image can be printed in only black and white color.

Because the user can carry out the operation of the color specification input in the digital camera B, the user can carry out the operation similarly when carrying out the operation that instructs printing of the image.

A second embodiment of the image forming apparatus is explained next. Units those are common with the first embodiment are explained by using the same reference numeral and a redundant explanation is omitted.

FIG. 7 is a functional block diagram of the printer A and the digital camera B according to the second embodiment. In the second embodiment, the color material specifying unit KB3 is not included in the digital camera B. On the contrary, a color material specifying unit KA4 is included in the printer A. The color material specifying unit KA4 receives the specification input that specifies the color material via the operation display unit 5, and generates the color material specification data based on the specification input. The color material specification retrieving unit KA3 retrieves the color material specification data generated by the color material specifying unit KA4.

Figure 8:
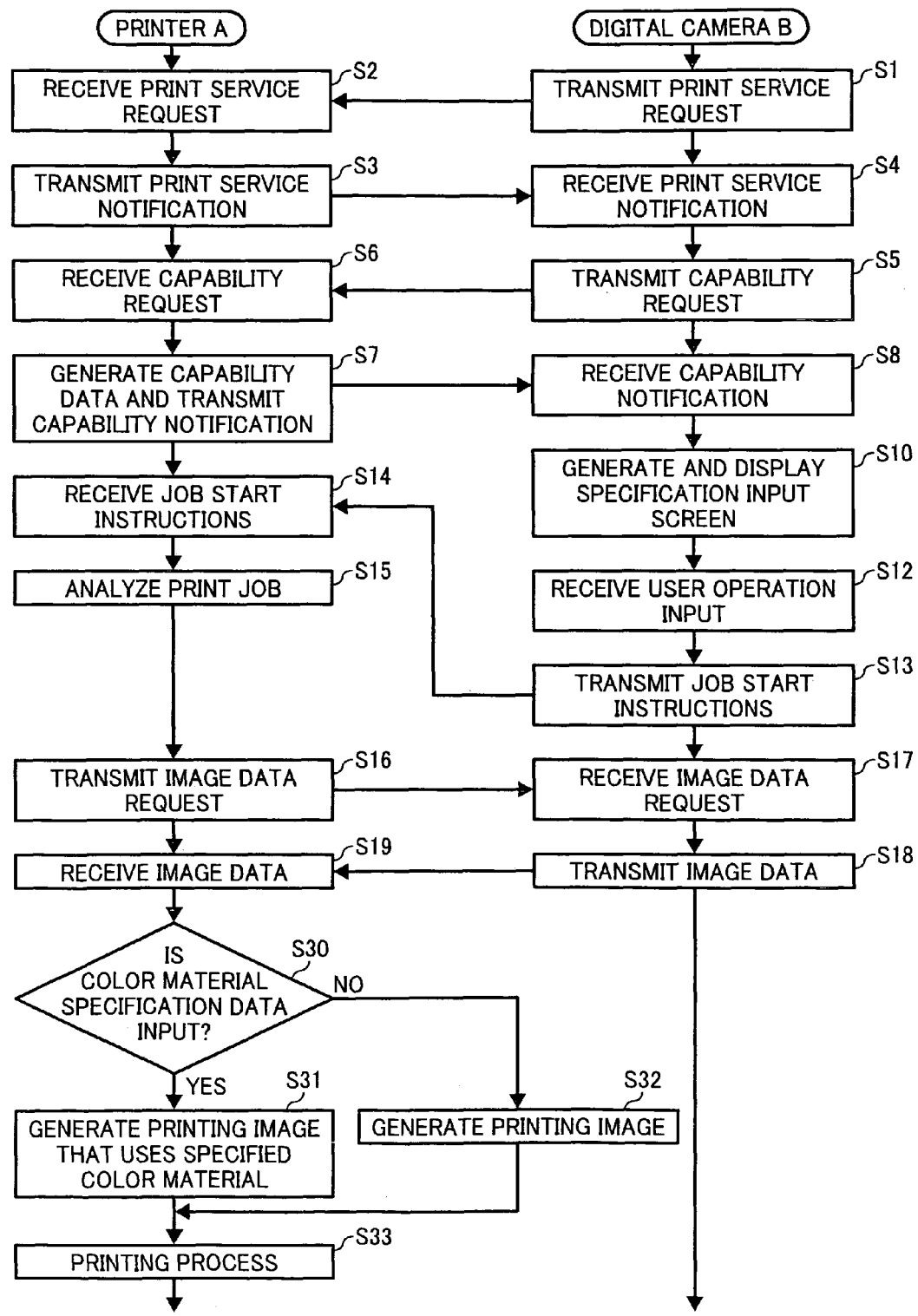
FIG. 8 is a flowchart for explaining a procedure of printing operations according to the second embodiment.

FIG. 8 is a flowchart for explaining a procedure of the printing operations according to the second embodiment. Similarly as in the first embodiment, the digital camera B transmits print service request command to the printer A. In the present embodiment, the digital camera B does not include the color material specifying function. Thus, the color material specifying function data is not included in print service request command. If the user inputs specification of the color material via the operating unit 19 of the printer A, the printer A generates the color material specification data based on the specification input, and stores the color material specification data in the external storage unit 18. Subsequently, similarly as in the first embodiment, processes from steps S1 to S8 are executed. At step S7 described above, the printer A includes, in capability notification response, the capability data that can be specified at the time of printing at the own terminal, and transmits, to the digital camera B, the color material control capability data including a color material controlling function. However, according to the second embodiment, the color material control capability data is not included in the capability data.

Upon receiving capability notification response (step S8), the digital camera B generates the specification input screen based on the capability data included in capability notification response (step S10). In the specification input screen, the input field is not included for a user to input the color material specification. The digital camera B displays the generated specification input screen on the display unit 17. Based on the display of the specification input screen, the user inputs the various printing conditions via the operating unit 19, and selects the image data to be printed. Upon receiving operation instruction input by the user (step S12), the digital camera B transmits, to the printer A, job start instructions command that includes the print job data (step S13). FIG. 9 is an example of the data structure of the print job data. As shown in FIG. 9, the print job data includes the specification data J1 that specifies the output quality, the specification data J2 that specifies the paper size, the specification data J3 that specifies the availability of the index printing, the specification data J5 that specifies the image data ID of the image data to be printed. The color material specification data J4 that specifies the color material that is explained in the first embodiment is not included in the print job data.

Upon receiving job start instructions command (step S14), the printer A analyzes the print job data included in job start instructions command (step S15). Similarly as in the first embodiment, the printer A sequentially transmits image data request response to the digital camera B (step S16). Based on image data request response, the digital camera B sequentially transmits the image data to the printer A (steps S17 to S18). The printer A receives the image data (step S19), and determines whether the color specification is input via the operation display unit 5. In other words, printer A determines whether the color material specification data is stored in the external storage unit 18 (step S30). If the color specification is input (Yes at step S30), the printer A generates the printing image that uses the color material specified based on the color material specification data (step S31). If the color specification is not input (No at step S30), similarly as in commonly used printer, the printer A generates the printing image of the image data to be printed (step S32). Upon generating the printing image, the printer A executes the printing process (step S33).

According to the structure described above, because the color material can be specified in the printer A, the user can specify the color material without depending upon functions of the digital camera B.

The present invention is not limited to the embodiments mentioned earlier. As the example, various modifications are explained below.

In the embodiments mentioned earlier, the color material specification data is included in the print job data. However, instead of including the color material specification data in each print job, the color material specification data can be included in each image data. For example, the color material specification data can be included in a header of the image data to be printed. For example, the header that stores therein data, such as a width and a height of the image, is included for the image data having exchangeable image file or joint photographic experts group (Exif or JPEG) format. An area such as MakerNote that can store therein any data is set in the header. The color material specification data can be written in the area. In the structure, because the color material can be specified for each image data, the user selects the image data separately, specifies the color material for each selected image data or with respect to the multiple selected image data, and specifies the same color material in batch. Upon receiving the image data from the digital camera B, the printer A analyzes the area mentioned earlier in the image data, and retrieves the color material specification data. In other words, the printer A analyzes each image data, generates the print data that uses the color material specified for each image data, and executes the printing process.

The color material specification data can be written in the image data when the printing instructions are provided or when the image is taken. For example, when the image is taken in a monochromatic mode that reproduces the color in two colors such as black and white, the color material specification data is written in the header of the image data that represents the image. Thus, while printing the image taken in the monochromatic mode, the image can be printed only by using the color material K.

Furthermore, when specifying the color material for each image data, the print job data can be generated for each image data. For example, the digital camera B generates the print job data for each image ID specified in the specification data J5 of the print job data shown in FIG. 6. Thus, it is desirable that each print job data is to be generated by the digital camera B in such a manner that the color material specification data corresponding to each image data is included.

In the embodiments mentioned earlier, not only the color material can be specified but also a color material usage percentage can be specified. FIG. 10 is an example of the print job data including the color material specification data that specifies the color material usage percentage. As shown in FIG. 10, the color material specification data J4 indicates 75 percent usage of each color material such as K, C, M, and Y. By specifying the usage percentage of the color material less than 100 percent, a usage quantity of a toner or a tank can be reduced. The usage percentage specification can be applied for a temporary printing for confirmation, in other words, for a trial printing.

According to the second embodiment, the digital camera B does not include the color material specifying function. However, the digital camera B can include the color material specifying function. In such a structure, the color material to be used with priority from the color material specified in the printer A, and the color material that is specified in the digital camera B are already set. For example, data (priority data) indicating the color material to be prioritized is stored in the parameter memory 3 of the printer A. As explained in the first embodiment, the digital camera B puts the color material specifying function data in print service request command, and transmits such print service request command to the printer A. When the color material specifying function data is included in print service request command, the printer A refers to the priority data stored in the parameter memory 3, and determines the color material to be prioritized from the color material specified in the printer A and the color material specified in the digital parameter B. Similarly as in the first and the second embodiments, the printing process is executed by using the specified color material.

In the embodiments mentioned earlier, control processing programs that are executed in the printer A and the control processing programs that are executed in the digital camera B can be stored in a computer that is connected to a network, such as the Internet, and provided by downloading from the network.

Instead of retrieving from the printer A or the digital camera B, the color material specification data in the embodiments mentioned earlier can also be retrieved from a data processor that is connected to the printer A. Specifically, the data processor is a general computer to be operated by a user. The data processor generates the color material specification data that is mentioned earlier and transmits to the printer A. Upon receiving the color material specification data transmitted from the data processor, the printer A forms and outputs the image by using the color material that is specified based on the color material specification data.

According to an aspect of the present invention, a color material can be specified when forming an image. For example, instead of mixing multiple color materials and reproducing a color of the image, the color of the image can be reproduced by using only one color material or the color differing from an original image. Thus, different variations can be provided in the image printing.

According to another aspect of the present invention, a user can specify the color material via an operating unit, thereby enabling to output the image in which the color is reproduced by using the color material desired by the user. Thus, a convenience of the user can be enhanced.

According to still another aspect of the present invention, a usage percentage of the color material can also be specified. For example, when performing a trial printing, the image can be printed by controlling a quantity of the color material to be used, thereby enabling to reduce a usage cost of the color material.

According to still another aspect of the present invention, color material specification data is written in a predetermined data area of image data, thereby enabling to specify the color material for each image data.

According to the above embodiments, following notes are disclosed.

(Note 1) An image supplying apparatus comprising:
a storage unit that stores therein image data;
a data generating unit that generates color material specification data that specifies a color material to be used when forming the image; and
a transmitting unit that transmits, to an image forming apparatus, the image data stored in the storage unit, print instruction data, and the color material specification data generated by the data generating unit.

(Note 2) The image supplying apparatus according to note 1, wherein
the transmitting unit appends, to the print instruction data, the color material specification data generated by the data generating unit, and transmits the color material specification data to the image forming apparatus.

(Note 3) The image supplying apparatus according to note 1, wherein
the color material specifying unit writes the color material specification data into a predetermined data are of the image data, and
the transmitting unit transmits, to the image forming apparatus, the image data with the color material specification data.

(Note 4) The image supplying apparatus according to note 1, further comprising an operating unit to be used by a user to input specification information, wherein
the data generating unit generates the color material specification data based on the specification information.

(Note 5) An image printing system comprising:
an image forming apparatus that includes
a receiving unit that receives image data and print instruction data; and
an image output unit that forms an image from the image data by using at least one color material;
an image supplying apparatus that includes
a transmitting unit that transmits, to the image forming apparatus, the image data stored in a storage unit and the print instruction data;
a data generating unit that generates color material specification data that specifies the color material to be used when forming the image; and
an acquiring unit that acquires the color material specification data generated by the data generating unit, wherein
the image output unit forms the image based on the color material specification data acquired by the acquiring unit.

(Note 6) A method of printing an image comprising:
transmitting, by an image supplying apparatus, image data stored in a storage unit of the image supplying apparatus and print instruction data;
receiving, by an image forming apparatus, the image data and the print instruction data;
forming, by the image forming apparatus, the image from the image data received at the receiving;
printing, by the image forming apparatus, the image on a recording paper by using at least one color material when the image is formed at the forming;
generating, by one of the image forming apparatus and the image supplying apparatus, color material specification data that specifies the color material to be used when forming the image; and
acquiring, by the image forming apparatus, the color material specification data generated at the generating, wherein
the forming includes forming the image based on the color material specification data acquired at the acquiring.

(Note 7) A computer program product comprising a computer usable medium having computer readable program codes embodied in the medium that, when executed, causes a computer to execute:

receiving image data and print instruction data;

acquiring color material specification data that specifies color material to be used when forming an image based on the image data; and forming an image from the image data based on the color material specification data.

(Note 8) A computer program product comprising a computer usable medium having computer readable program codes embodied in the medium that, when executed, causes a computer to execute:

generating color material specification data that specifies a color material to be used when forming the image; and transmitting, to the image forming apparatus, the color material specification data generated at the generating.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image forming apparatus comprising:
a receiving unit that receives image data and first color material specification data from a digital camera;
a color material specifying unit that generates second color material specification data based on an input from a user;
an acquiring unit that acquires the first color material specification data and acquires the second color material specification data from the color material specifying unit, each of the first and second color material specification data specifying at least one color material to be used when forming an image from the image data, the at least one color material including cyan, magenta, yellow, and black, each of the first and second color material specification data including a first field for the black color material, a second field for the cyan color material, a third field for the magenta color material, and a fourth field for the yellow color material, each of the first field, second field, third field, and fourth field being in one of an on state and off state, the on state indicating that the color material is used and the off state indicating that the color material is not used in any portion of the image;
a storage unit that stores priority data, the priority data indicating which of the first and second color material specification data is prioritized; and
an image output unit that forms the image from the image data based on the color material specification data indicated as prioritized from the priority data.

2. The image forming apparatus according to claim 1, wherein
the receiving unit further receives print instruction data, the print instruction data includes the first color material specification data, and
the acquiring unit extracts the first color material specification data from the print instruction data.

3. The image forming apparatus according to claim 1, wherein
the first color material specification data is written in a predetermined data area of the image data, and
the acquiring unit extracts the first color material specification data from the data area of the image data.

4. The image forming apparatus according to claim 3, wherein
a data format of the image data is one of a tagged image file format and an exchangeable image file format, and
the first color material specification data is written in a predetermined image file directory tag of the image data.

5. The image forming apparatus according to claim 1, further comprising:
an operating unit to be used by the user to input specification information;
a data generating unit that generates the second color material specification data from the specification information, wherein
the acquiring unit retrieves the second color material specification data generated by the data generating unit.

6. The image forming apparatus according to claim 1, wherein
each of the first and second color material specification data further specifies a usage percentage of the color material, and
the image output unit further forms the image by using the usage percentage specified from the color material specification data indicated as prioritized.

7. The image forming apparatus according to claim 1, wherein when the user specifies a black and white mode, the image is formed only from the black color material without mixing the color materials of cyan, magenta, and yellow.

8. A method of forming an image, the method comprising:
receiving, by a receiving unit, image data and first color material specification data from a digital camera;
generating, by a color material specifying unit, second color material specification data based on an input from a user;
acquiring, by a acquiring unit, the first color material specification data and the second color material specification data, each of the first and second color material specification data specifying at least one color material to be used when forming an image from the image data, the at least one color material including cyan, magenta, yellow, and black, each of the first and second color material specification data including a first field for the black color material, a second field for the cyan color material, a third field for the magenta color material, and a fourth field for the yellow color material, each of the first field, second field, third field, and fourth field being in one of an on state and off state, the on state indicating that the color material is used and the off state indicating that the color material is not used in any portion of the image;
storing, by a storage unit, priority data, the priority data indicating which of the first and second color material specification data is prioritized; and
forming, by an image output unit, the image from the image data based on the color material specification data indicated as prioritized from the priority data.

9. The method of claim 8, further comprising:
receiving, by the receiving unit, print instruction data, the print instruction data including the first color material specification data, wherein the acquiring step extracts the first color material specification data from the print instruction data.

10. The method of claim 8, wherein the acquiring step extracts the first color material specification data from a data area of the image data, wherein the first color material specification is written in a predetermined data area of the image data.

11. The method of claim 10, wherein a data format of the image data is one of a tagged image file format and an exchangeable image file format, and the first color material specification data is written in a predetermined image file directory tag of the image data.

12. The method of claim 8, further comprising:

inputting, by an operating unit, specification information by the user; and generating, by a data generating unit, the second color material specification data from the specification information, wherein the acquiring step retrieves the generated second color material specification data.

13. The method of claim 8, wherein each of the first and second color material specification data further specifies a usage percentage of the color material, wherein the forming step forms the image by using the specified usage percentage from the color material specification data indicated as prioritized.

14. The method of claim 8, wherein when the user specifies a black and white mode, the forming step forms the image from only the black color material without mixing the color materials of cyan, magenta, and yellow.

* * * * *